3,117,053
ONE-STEP MOLDING

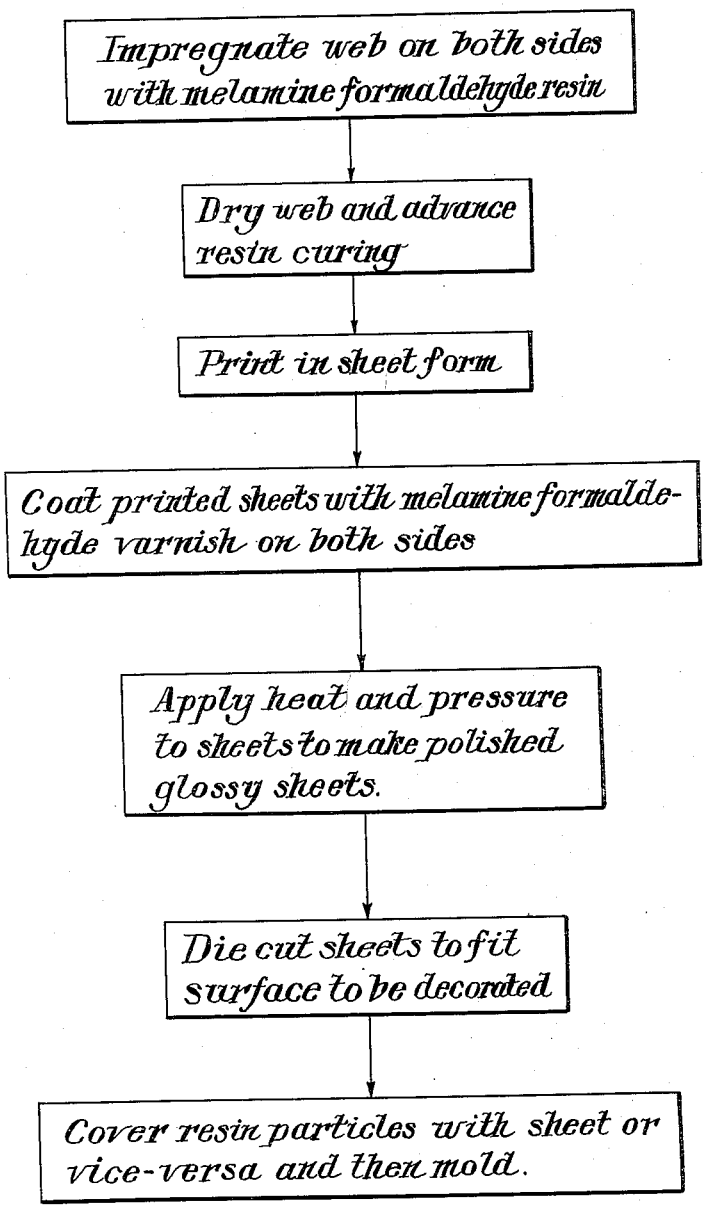

Winthrop S. Lawrence, Landenberg, Pa., and Walter L. Hochner, Wilmington, Del., assignors to Kaumagraph Company, Wilmington, Del., a corporation of Delaware
Filed Mar. 7, 1961, Ser. No. 93,967
7 Claims. (Cl. 161—146)

This invention is directed to an improved decorated foil for use in the molding of melamine-formaldehyde resin articles. More specifically, it is directed to an improvement in a one-step molding operation, that improvement being in the use of specially preparing decorated foil for applying the decoration to the molded article during molding. This application is a continuation-in-part of co-pending application Serial No. 793,615, filed February 16, 1959, now Patent No. 3,057,018.

The parent case describes a method of molding wherein a decorated resin-impregnated foil is placed in a mold and covered with a quantity of thermosetting molding powder such as melamine-formaldehyde or urea-formaldehyde, and the mold is then closed. Subsequent compression of the resin during molding cures the resin and embeds the decorated foil in, and bonds it to, the molded article. The great advantage of one-step molding is that it eliminates the conventional first step of forming a shaped preform of the resin the mold before the printed foil is applied thereto.

However, the conventional foils, composed of rayon (regenerated cellulose) or paper (native cellulose) are too weak and fragile to withstand the pitting action of the molding particles and irregularities of pressure as they are compressed against the paper foil at pressures in the neighborhood of 3000 p.s.i. Such stresses do not arise when a foil is compressed against a smooth preformed surface. Accordingly, it has been necessary to use a reinforcement or backing sheet for decorated foils of that type. This is illustrated in British Patent 739,801. This process requires an extra sheet and an extra operation to fit the sheet to the decorated foil. Alternatively, one may use as the decorated foil one composed of a sturdy synthetic fibre such as nylon, a polyester such as Dacron, or a polyacrylonitrile such as Orlon. However, these fabrics are costly and do not become transparent during molding as does a rayon or cellulose foil. Accordingly, the art has need of a means of treating a cellulosic foil which will give it the strength necessary to withstand the stresses to which it is subjected in one-step molding so as to dispense with a backing sheet.

The search for a suitable material which would meet all requirements has been extensive. The requirements might be stated as low price, absorption, transparency when molded, low extensibility under stress, durability under high stress, attractive appearance, high gloss, lack of weave, workability in impregnation and molding, die cuttability, printability, non-hygroscopicity, good shelf life, and heat resistance.

The present applicants have found that the answer to the problem lies in a specific sequence of operations which must be applied to the cellulosic foil before it is placed in a mold for use. This sequence is illustrated in the drawing which is in the form of a flowsheet. Referring to the drawing, the foil is first impregnated with melamine-formaldehyde resin on both sides in web form and the web is then dried to remove solvent and advance the condensation of the resin. The web is then cut into a series of individual sheets which are printed with the desired design and then coated on both sides with melamine-formaldehyde resin. (Coating on only one side gives curl problems; also off-setting of the ink against the mold.) A surface coat protects the ink in molding. The resin-coated sheets are heated under a pressure of about 30 p.s.i., preferably between chrome-coated plates, to form polished glossy foils. These need only be die-cut to fit the dimensions of the molded article to which they are to be applied, and they can then be placed in a mold, covered with resin particles (or placed on the resin molding powder charge) and compressed into the surface of the resulting molded article.

The term "press-polishing" as used in the specification and claims denotes the process of pressing the decorated foil, after it has been coated with melamine-formaldehyde on both sides, between smooth metal plates under elevated temperature and pressure so as to impart a glossy surface thereto while advancing the condensation of the melamine-formaldehyde resin.

In a specific embodiment of this process, the resin employed was melamine-formaldehyde and it was applied to the rayon foil in a proportion of two parts resin to one part paper. The press polishing operation following the resin-coating step was for a time of thirty seconds at 300° F. and resulted in a 40% condensation of the resin in the foil. This is as much as is customarily attained in the molding. In the usual process, the foil is treated with a resin prior to molding, but this is condensed only to about 20–25% prior to printing and molding. The high degree of condensation of the resin in applicants' foil prior to molding makes it unnecessary for the resin in the foil to cross-link with that in the molded article during molding. In the specific embodiment, the foil was supported against the flat mold surface during molding.

No invention is claimed in the molding conditions, the resin used, or the decorative media employed. The resin is preferably melamine-formaldehyde, although urea-formaldehyde is also operative, along with other thermosetting resins of that type. These resins, and the inks which may be used to decorate the foils, are discussed at some length in the parent case Serial No. 793,615, and, hence, need not be further described in this case.

It was surprising to find that a known cellulosic absorbent paper could be treated with a known thermosetting resin, but in a manner that would strengthen it enough to withstand a one-step molding operation. Such foils, before press polishing, are friable and brittle at the usual 25–30% degree of resin advance. However, further cure to about 40%, as in this case, develops enough durability to meet all the requirements of a molding overlay for one-step molding. The weight and strength of the paper can be varied as the occasion demands, so that the method is capable of adaptation to a variety of molding conditions. It is unnecessary to use such precautions as slow closing during molding.

Press polishing a melamine-formaldehyde-treated foil makes it the toughest material which applicants have been able to find for one-shot molding. It is stronger than fortisan, glass, etc., the materials which have been used before. It also gives a tough, stable material (no shelf-life problem), rigid, easily handled by automatic equipment.

The foil is so tough, it does not have to be supported by molding powder over its entire area. As a matter of fact, areas two or three times the area of the molding powder can be molded successfully one-shot. Thus, whereas, in the prior art, the area of the molding powder is approximately the same as that of the foil which supports it, applicants can place a small area of molding powder over (or under) a foil of much larger area and mold this in one-step without tearing or distorting the foil.

While the principal embodiment of the invention is as described in the flowsheet, it is also possible to print the design on the raw sheet, then to pass this through an impregnating bath as in the first step of the flowsheet so as to impregnate the sheet on both sides. It is then press-polished in the manner described earlier.

What is claimed is:

1. In a process for the one-step molding of a decorated melamine-formaldehyde resin article wherein a quantity of melamine-formaldehyde particles are placed in a mold and compressed therein against a decorated fibrous press-polished foil to bond the foil to one side of the resulting molded article, the improvement comprising employing as the foil in this process a single sheet of decorated absorbent paper, the latter having been prepared by previously impregnating it with melamine-formaldehyde on both sides, printing, applying a coating of melamine-formaldehyde to both sides of the printed foil, and then heating it under pressure between heated metal plates for a time sufficient to effect about 40% condensation of the resin to form a polished glossy cured sheet.

2. Process of claim 1 wherein the press-polishing is conducted for a time of thirty seconds at a temperature of 300° F.

3. In a process for the one-step molding of a decorated melamine-formaldehyde resin article wherein a quantity of melamine-formaldehyde particles are placed in a mold and compressed therein against a decorated fibrous press-polished foil to bond the foil to one side of the resulting molded article, the improvement comprising employing as the foil in this process a single sheet of decorated absorbent paper, the latter having been prepared by printing, coating with melamine-formaldehyde on both sides, and then heating it under pressure between heated metal plates for a time sufficient to effect 40% condensation of the resin to form a press-polished glossy cured sheet.

4. A process for preparing an ornamented cellulosic foil adapted for bonding to the surface of a melamine-formaldehyde molded article during the one-step molding thereof which comprises printing a decorative design on a fibrous cellulosic foil, impregnating the latter with a melamine-formaldehyde resin on both sides, subjecting the resin-impregnated foil to elevated temperature and pressure between heated metal plates for a time sufficient to effect about 40% condensation of the resin, and recovering from this process a strong, tough, glossy foil which can withstand the stresses of a one-step melamine-formaldehyde molding operation.

5. A process of preparing an ornamented cellulosic foil adapted for bonding to the surface of a melamine-formaldehyde molded article during the one-step molding thereof which comprises impregnating a fibrous cellulosic foil with melamine-formaldehyde resin on both sides, drying and partially condensing the resin, applying a design to said foil, coating the latter with a melamine-formaldehyde resin on both sides, subjecting the resulting foil to elevated temperature and pressure between heated metal plates for a time sufficient to effect about 40% condensation of the resin, and recovering from this process a strong, tough, glossy foil which can withstand the stresses of a one-step melamine-formaldehyde molding operation.

6. A decorated foil that is produced by printing an absorbent cellulosic sheet that has been first impregnated with melamine resin, dried and advanced in cure, and then drying the ink and press-polishing the printed foil under heat and pressure between polished metal plates to develop a resin-impregnated sheet wherein the resin in the foil is about 40% condensed, which foil is capable of being further molded and adhered to a plastic article by the application of higher temperatures and pressure, and is strong and durable enough to withstand the stresses developed when the foil is used in a process of one-step compression molding of melamine-formaldehyde resins.

7. A decorated foil that is produced by first printing an absorbent cellulosic sheet, then impregnating with melamine-formaldehyde resin, drying this impregnated sheet and partially curing and then press-polishing it under heat and pressure between polished metal plates to develop a resin-impregnated sheet wherein the resin is about 40% condensed, which foil is capable of being further molded and adhered to a plastic article by the application of higher temperatures and pressure, and is strong and durable enough to withstand the stresses developed when the foil is used in a process of one-step compression molding of melamine-formaldehyde resins.

References Cited in the file of this patent

UNITED STATES PATENTS

| 2,410,361 | Prance | Oct. 29, 1946 |
| 2,652,375 | Cordier et al. | Sept. 15, 1953 |
| 2,668,124 | Mallabar | Feb. 2, 1954 |
| 2,760,899 | Cameron et al. | Aug. 28, 1956 |
| 2,833,685 | Lawrence | May 6, 1958 |

FOREIGN PATENTS

| 567,063 | Great Britain | Jan. 26, 1945 |
| 739,801 | Great Britain | Nov. 2, 1955 |

OTHER REFERENCES

"Laminating With Melamine Resins," by T. W. Noble, an article in Plastics, December 1946, pp. 46, 48, 49, 94 and 95.